United States Patent [19]

Franchini

[11] Patent Number: 4,928,317
[45] Date of Patent: May 22, 1990

[54] RADIO-OPTICAL TRANSMISSION SYSTEM, IN PARTICULAR FOR SPACE TELECOMMUNICATIONS

[75] Inventor: Elisabeth Franchini, Ramonville Saint Ague, France

[73] Assignee: Societe Anonyme dite: Alcatel Espace, Courbeyoie, France

[21] Appl. No.: 257,620

[22] Filed: Oct. 14, 1988

[30] Foreign Application Priority Data

Oct. 29, 1987 [FR] France ............................... 87 14994

[51] Int. Cl.$^5$ ............................................. H04B 9/00
[52] U.S. Cl. .................................... 455/601; 455/617
[58] Field of Search ............... 455/617, 601, 600, 618, 455/619, 609

[56] References Cited

U.S. PATENT DOCUMENTS

| | | | |
|---|---|---|---|
| 4,307,469 | 12/1981 | Casper et al. | 455/618 |
| 4,491,982 | 1/1985 | Candy et al. | 455/601 |
| 4,504,976 | 3/1985 | Beaudet | 455/618 |
| 4,611,352 | 9/1986 | Fujito et al. | 455/609 |
| 4,709,416 | 11/1987 | Patterson | 455/618 |

FOREIGN PATENT DOCUMENTS

| | | | |
|---|---|---|---|
| 2152679 | 4/1973 | France | 455/601 |
| 1218421 | 1/1971 | United Kingdom | 455/601 |

OTHER PUBLICATIONS

Lee; Conference: 1981 International Conference on Communications; "Technology Assessment for Implementation of Optical Intersatellite Link;" Denver, Col.; Jun. 14–18, 1981.

Way, "A 1.3 um 35 Km Fiber Optic Microwave Multicarrier Transmission System for Satellite Earth Stations", Journal of Lightwave Technologies vol. LT.

Globecom '85 IEEE Global Telecommunications Conference, New Orleans Louisiana, Dec. 2-5, 1985 Conference Record, vol. 3 des 3, pp. 1181–1184, IEEE, New York, US; C.-YEN et al.

IEEE International Conference on Communications: Integrating Communication for World Progress, Boston, Mass., Jun. 19–22, 1983.

Conference Record, vol. 3, pp. 1201–1207, IEEE New York, US; V.W.S. Chan et al.

Primary Examiner—Douglas W. Olms
Assistant Examiner—L. Van Beek
Attorney, Agent, or Firm—Sughrue, Mion, Zinn, MacPeak & Seas

[57] ABSTRACT

A radio-optical transmission system in particular for space telecommunications, comprising a radio-optical interface between a first modulated radio wave (15) and a light wave (18), wherein the transmitted light wave (18) is subjected to wavelength modulation.

4 Claims, 2 Drawing Sheets

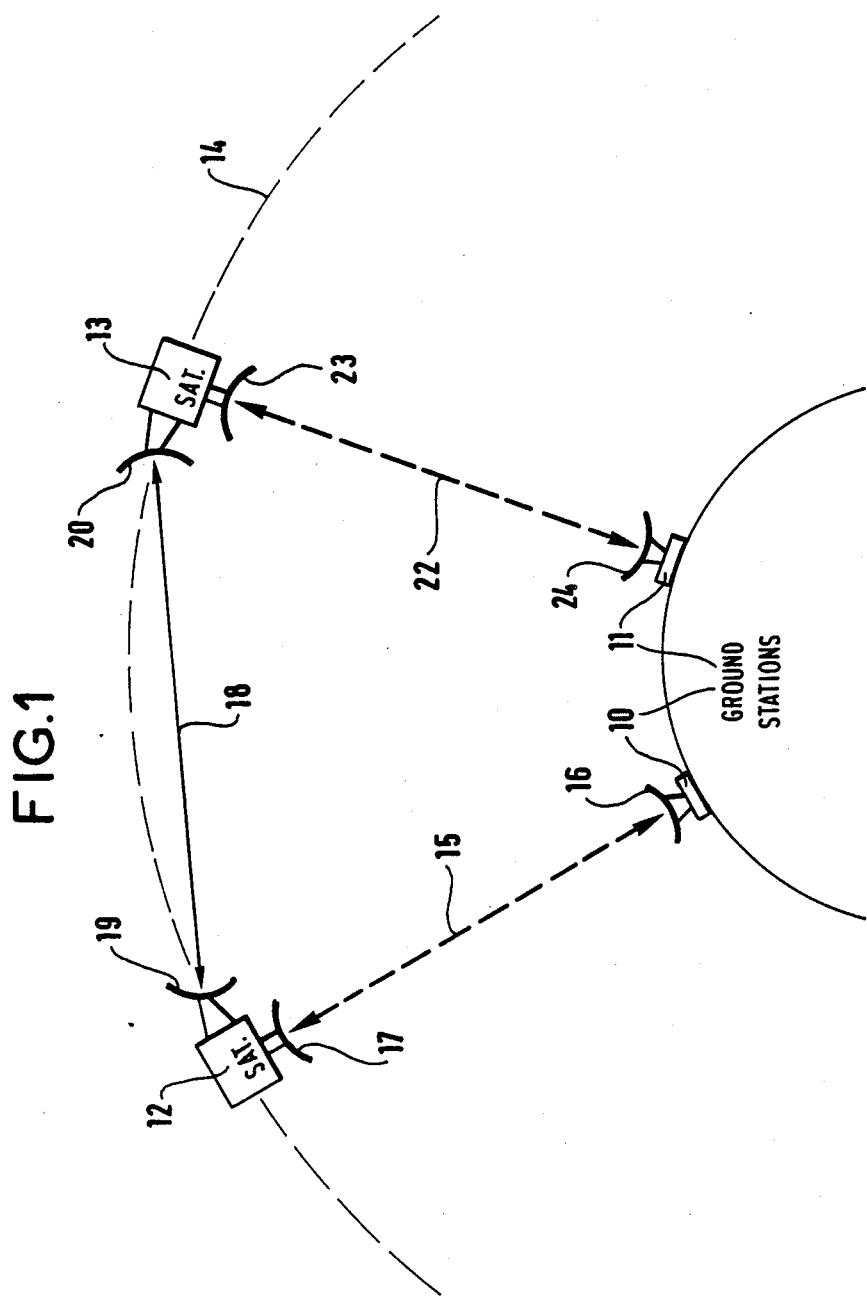

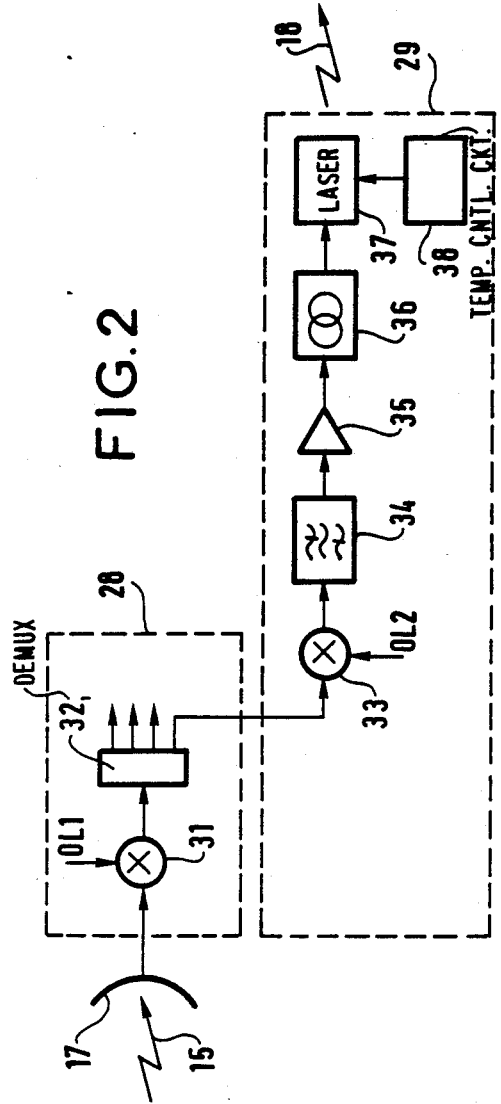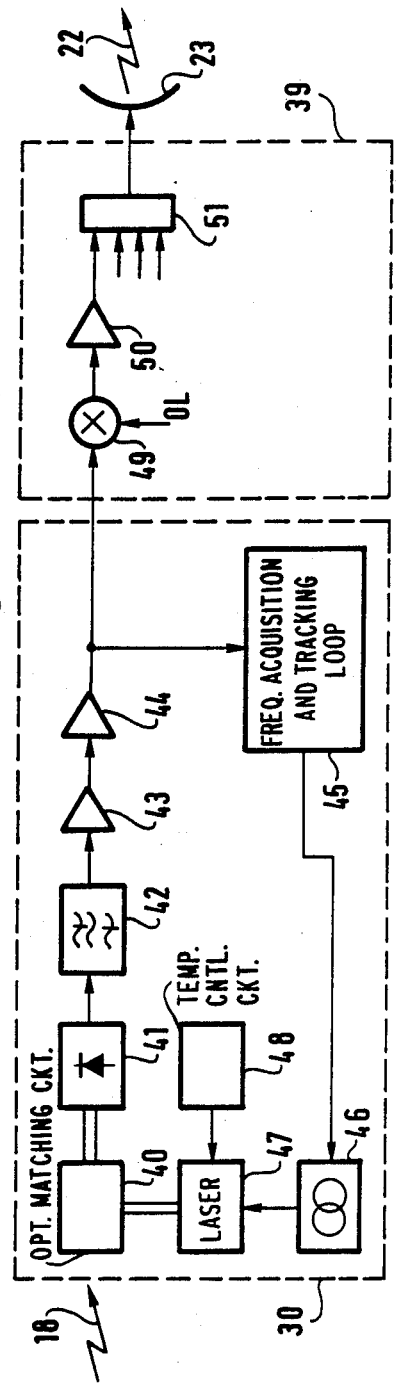

RADIO-OPTICAL TRANSMISSION SYSTEM, IN PARTICULAR FOR SPACE TELECOMMUNICATIONS

The invention relates to a radio-optical transmission system, in particular for space telecommunications.

BACKGROUND OF THE INVENTION

A document entitled "Assessment of optical communications systems for data relay satellite" by J. L. Perbos and B. Laurent published in IAF 86 relates to the possibility of using optical technologies for providing the high data rate (HDR) communications links of the future European data transmission satellite system. Two particular optical technologies are envisaged in this document for providing inter-satellite communications: one is based on using $CO_2$ lasers operating at 10.6 $\mu$m, and the other on semiconductor laser diodes operating in the band 0.8 $\mu$m to 1.3 $\mu$m. In the context of inter-satellite optical links, one such document describes direct modulation of semiconductor lasers which requires the microwave signal reaching the first satellite to be demodulated prior to establishing a direct optical link between the two satellites, and which then requires the information regenerated on board the second satellite to be remodulated for retransmission to the ground at microwave frequencies.

Thus, when using a radio link (e.g. microwave frequency - optical frequency) it is not possible to retransmit without passing via baseband, i.e. without demodulation and regeneration.

The object of the invention is to mitigate this drawback by providing transitions between microwave frequencies and optical frequencies which are as simple as possible.

SUMMARY OF THE INVENTION

For this purpose, the present invention provides a radiooptical transmission system, in particular for space telecommunications, comprising a radio-optical interface between a first modulated radio wave and a light wave, and wherein the transmitted light wave is subjected to wavelength modulation.

The invention thus makes it possible to omit intermediate data demodulation, regeneration, and remodulation in the context of optical links, e.g. inter-satellite links, or more generally successive links including microwave and then optical links.

Advantageously, the transmission system includes: an optical-radio interface between said light wave and a second modulated radio wave, said radio waves being at a microwave frequency. The first interface is on board a first satellite and the second interface is on board a second satellite. The first radio wave is a microwave emitted by a first ground station and received by the first satellite, and the second radio wave is a microwave emitted by the second satellite and received by a second Earth station.

Advantageously, in accordance with the invention, successive microwave and optical links can thus be implemented without demodulating, regenerating, and remodulating the signal. For inter-satellite optical links, the invention makes it possible to reduce the amount of equipment on board the satellites, and in some cases it makes it possible to change the nature of the transmitted signal (e.g. the modulation of the up microwave link), should that be necessary.

BRIEF DESCRIPTION OF THE DRAWINGS

An embodiment of the invention is described by way of example with reference to the accompanying drawings, in which:

FIG. 1 is a diagram showing the system of the invention;

FIG. 2 shows a microwave-to-optical interface; and

FIG. 3 shows an optical-to-microwave interface.

MORE DETAILED DESCRIPTION

In the embodiment shown in FIG. 1, the system of the invention comprises:

first and second ground stations 10 and 11; and first and second satellites 12 and 13 on a geostationary orbit 14.

The first satellite 12 contains a first interface device between a first modulated radio wave 15, e.g. a microwave, transmitted between microwave antennas 16 and 17 respectively at the first ground station 10 and at said first satellite 12, and a light wave 18 transmitted between two transmitter/receiver systems 19 and 20 carried by the first and second satellites 12 and 13, respectively.

The second satellite 13 contains a second interface device between said light wave 18 and a second modulated radio wave 22, e.g. a microwave, transmitted between microwave antennas 23 and 24 respectively carried by the second satellite 13 and at the second ground station 11.

As shown in FIG. 1, the links 15, 18, and 22 are two-way links, so each of the two interfaced devices comprises:

a microwave-to-optical interface; and an optical-to-microwave interface.

In the system of the invention, the optical transmission 18 is subjected to modulation. Several different types of modulation may be envisaged for an optical transmission: direct on/off modulation of light intensity (corresponding to baseband transmission); or modulation of the light in amplitude, wavelength, or phase. In accordance with the invention, the modulation is wavelength modulation.

As shown in FIG. 2, the microwave-to-optical interface comprises:

a microwave receiver circuit 28; and an optical transmitter circuit 29.

The microwave receiver circuit 28, connected to a microwave antenna, e.g. the antenna 17, essentially comprises a mixer 31 receiving an oscillator signal OL1, and a demultiplexer 32, e.g. for selecting a particular channel.

The optical transmitter circuit 29 comprises a mixer 33 receiving an oscillator signal OL2 followed by a filter 34, an amplifier 35, and a current controlling circuit 36 for controlling a laser 37 which is connected to a temperature control circuit 38.

The microwave circuit 28 is conventional for the person skilled in the art.

The optical transmitter circuit 29 serves to provide frequency translation of said microwave signal in order to make it compatible with the passband of the optical transmission circuit. It then allows said signal to be filtered (34) and it then enables said signal to modulate the injection current of the laser 37.

Frequency modulation (or wavelength modulation) of the transmitter laser is obtained by modulating its injection current.

The laser must be temperature stabilized (38) because of the sensitivity of its transmission wavelength to this parameter, and the width of its emission spectrum line should be reduced down to a value compatible with the required transmission rate and quality of transmission.

In one embodiment, the antenna (e.g. antenna 17 in FIG. 1) receives a microwave 15 at 30 GHz, for example. An 800 MHz signal is available at the outlet from the mixer. The laser is a semiconductor laser emitting, for example, a light wave such that $\lambda = 1.3$ μm (where $\lambda$ is the central wavelength), with said wavelength $\lambda$ being modulated.

As shown in FIG. 3, the optical-to-microwave interface comprises:
 an optical receiver circuit 30; and
 a microwave transmitter circuit 39.

The optical receiver circuit comprises an optical matching circuit 40 followed by a detector diode 41, a filter 42, a preamplifier 43, and an amplifier 44.

A frequency acquisition and tracking loop 45 is coupled to the outlet of the amplifier 44 and is followed by a current controlling circuit 46 for controlling the frequency of a laser 47 whose temperature is regulated by a temperature control circuit 48. The laser 47 is connected to the second input of the optical matching circuit 40.

The microwave transmitter circuit (which is conventional to the person skilled in the art) comprises a mixer 49 which receives an oscillator signal OL, followed by an amplifier 50, and a multiplexer 51 which is connected to a microwave antenna, e.g. the antenna 23.

The optical receiver circuit is thus constituted by a local oscillator laser 47 whose temperature is regulated (48) and whose emission spectrum line band width is compatible with the performance required, by a matching circuit 40 firstly for mixing the receive light signal with the signal from the laser 47 and secondly for compensating possible polarization of the light wave, by a receiver diode 41, by amplifiers 43 and 44, and by a frequency acquisition and tracking system 45. The incident light wave and the light wave from the local laser oscillator are detected by the diode 41 which, by field quadrature detection, generates an electrical signal at the difference frequency between the frequencies of the two light waves, thereby reproducing the information spectrum (as translated). The intermediate frequency is stabilized by the frequency tracking system 45, with the passband and the complexity of the system depending on external conditions (e.g. Doppler effects) and on the transmission modulation index. This system is based on using the outlet energy from the filters 42 disposed around the theoretical intermediate frequency.

A suitable selection of the intermediate frequency makes it possible (possibly after a second frequency translation and providing there is compatibility with the frequency bandwidth used) to insert the signal into the microwave link channels (following the optical link), by means of the microwave transmitter circuit 39.

In one embodiment, this signal received by the optical matching circuit is a signal having a central wavelength $\lambda = 1.3$ μm.

A signal having a frequency of 2 GHz is present at the inlet to the mixer, for example, and a signal is available at the outlet from the same mixer 49 and also at the outlet from the antenna 52 at a frequency of 20 GHz.

Naturally, the present invention has been described and shown purely by way of preferred example, and its component parts could be replaced by equivalent parts without thereby going beyond the scope of the invention.

For example, the system of the invention could be used in the combination: microwave link - optical submarine cable - microwave link.

I claim:

1. A radio-optical transmission system for transmitting information, in particular for space telecommunications, said system comprising:
 a first, radio-optical interface device for converting a first modulated radio wave to a light wave, said first radio-optical interface device being a microwaveoptical interface device comprising:
 a microwave receiver circuit; and
 an optical transmitter circuit connected to an output of said microwave receiver circuit and comprising, in succession:
 a mixer receiving an oscillator signal;
 a filter connected to an output of said mixer and providing a filtered output accordingly;
 an amplifier receiving said filtered output to provide an amplified filtered output;
 a current controlling circuit receiving said amplified filtered output and providing a current controlled output accordingly;
 a laser having its injection current modulated in accordance with said current controlled output; and
 a temperature control circuit connected to said laser, such that said optical transmitter circuit transmits said information without intermediate demodulation thereof;
said radio-optical transmission system further comprising a second, optical-radio interface device for converting said light wave to a second modulated radio wave, said second, optical-radio interface device being an optical-microwave interface device comprising:
 an optical receiver circuit comprising, in succession:
 an optical matching circuit followed by a detector diode;
 a filter connected to an output of said detector diode and providing a filtered output accordingly;
 at least one amplifier receiving said filtered output;
 a frequency acquisition and tracking loop coupled to an output of said amplifier;
 a laser;
 a current controlling circuit, coupled to an output of said frequency acquisition and tracking loop, for controlling the laser;
 a temperature control circuit for controlling the laser;
 said laser being connected to an input of the optical matching circuit, wherein said optical receiver receives said information without intermediate demodulation thereof; and
 a microwave transmitter circuit connected to an output of said optical receiver circuit.

2. A system according to claim 1, wherein the first radio optical interface device is on board a first satellite, and wherein the second optical radio interface device is on board a second satellite.

3. A system according to claim 2, wherein the first radio wave is a microwave emitted by a first ground station and received by the first satellite, and wherein the second radio wave is a microwave emitted by the second satellite and received by a second ground station.

4. A system according to claim 1, wherein the first and second modulated radio waves are microwaves.

* * * * *